United States Patent
Prabakaran et al.

(10) Patent No.: US 7,398,529 B2
(45) Date of Patent: Jul. 8, 2008

(54) METHOD FOR MANAGING OBJECTS CREATED IN A DIRECTORY SERVICE

(75) Inventors: Senthil Prabakaran, Norwood, MA (US); Vladimir Kazachkov, Chestnut Hill, MA (US); Dilip Radhakrishnan, Quincy, MA (US)

(73) Assignee: NetIQ Corporation, San Jose, CA (US)

( * ) Notice: Subject to any disclaimer, the term of this patent is extended or adjusted under 35 U.S.C. 154(b) by 1187 days.

(21) Appl. No.: 10/092,646

(22) Filed: Mar. 6, 2002

(65) Prior Publication Data

US 2002/0178249 A1    Nov. 28, 2002

Related U.S. Application Data

(60) Provisional application No. 60/274,819, filed on Mar. 9, 2001.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 11/00 | (2006.01) |
| G06F 12/00 | (2006.01) |
| G06F 17/30 | (2006.01) |

(52) U.S. Cl. ............................ 719/316; 714/1; 714/2; 714/100; 707/202

(58) Field of Classification Search ................. 719/318, 719/316; 709/223, 225; 714/100, 1, 2; 707/200, 707/202, 204

See application file for complete search history.

(56) References Cited

U.S. PATENT DOCUMENTS

| 5,557,747 A | 9/1996 | Rogers et al. |
| 5,878,408 A * | 3/1999 | Van Huben et al. ............ 707/1 |
| 5,889,953 A | 3/1999 | Thebaut et al. |
| 6,298,373 B1 | 10/2001 | Burns et al. |
| 6,308,216 B1 | 10/2001 | Goldszmidt et al. |
| 6,466,976 B1 | 10/2002 | Alles et al. |
| 2002/0095524 A1 * | 7/2002 | Sanghvi et al. ............. 709/318 |
| 2003/0009487 A1 | 1/2003 | Prabakaran et al. |

OTHER PUBLICATIONS

William Boswell, "Inside Windows 2000 Server," Published Dec. 22, 1999, New Riders Publishing, Chapters 6, 8, 10, 11, 15, and 16.*

(Continued)

*Primary Examiner*—Meng-Ai An
*Assistant Examiner*—Qing-Yuan Wu
(74) *Attorney, Agent, or Firm*—Myers Bigel Sibley & Sajovec

(57) ABSTRACT

A computerized method for managing objects created in a directory service of a distributed computing environment, including a component for backing up and restoring a single or plurality of directory service objects, a component for delegating security privileges to permit access to directory service objects, a component for retrieving data in policy storage format and representing the data in human-readable form, a component having a graphical user interface including a display capable of searching and reporting policy storage data in human readable form, a component capable of replicating a single or plurality of directory service objects across the domain tree boundaries of the directory service, a component for analyzing the effect a particular setting will have on a particular target represented as a directory service object before the setting is added to the directory service.

19 Claims, 7 Drawing Sheets

OTHER PUBLICATIONS

Sheesley, J. "Undertanding System Policies," *Microsoft TechNet*, Dec. 29, 2000 microsoft.com/technet/deploy/system.asp.

"CIM Core Policy Model," *Distributed Management Task Force, Inc.*, May 12, 2000, dmtf.org/spec/Whitepapers/CIM_Policy24_wp.htm.

* cited by examiner

METHOD FOR MANAGING OBJECTS CREATED IN A DIRECTORY SERVICE

CROSS-REFERENCE TO RELATED APPLICATIONS

This application claims priority from U.S. Provisional Patent Application Ser. No. 60/274,819, filed on Mar. 9, 2001, which is incorporated herein by reference in its entirety.

BACKGROUND

Personal computers (PCs) are widely used in homes and work environments alike. A common configuration for using computers in a work environment is the client-server local area network (LAN). In a LAN, each computer is connected by communication links to a main computer, known as a server. The server controls access to data files and other resources (e.g., printers and modems) located in the LAN that may be shared by the client computers. Multiple LANs may be connected to form larger networks. Alternatively, individual computers or entire LANs may be interconnected using a wide area network (WAN) such as the Internet.

Computers in a LAN or WAN environment (clients and servers) use an operating system. An operating system is a program or set of programs that runs on the computer to allow other programs to be executed. The operating system also provides an interface between the computer and the user. The operating system converts high-level commands from programs, such as print commands or requests for memory, into low-level system functions that implement the print operation or allocate the requested memory.

In a distributed computing environment (i.e., LANS and WANs), the physical topology of the network includes many networks objects (e.g., file servers, printers, applications, computers, and users). These network objects are often shared among various users. Some operating systems can store information about these network objects in a central database often referred to as a directory. In addition to storing the information in a directory, some operating systems have the capability of making the stored information about network objects available to users. This capability is often referred to as a directory service. Typically, the directory service acts as a main switchboard of the network's operating system.

Some directory services support the generation and implementation of policies. Policies are a set of enforceable parameters that control the operation and functionality of computers and peripheral hardware devices used by the computer (e.g., printers). Policies are utilized in both distributed computing environments (e.g., local area networks or wide area networks) and stand-alone computers. In a distributed computing environment, policies may be generated and stored in a central computer (e.g., a server computer) and downloaded to the individual computers linked to the network (e.g., workstation computers) each time a user logs on to the network. In a stand-alone computer, policies are generated and stored locally on the computer.

SUMMARY

In an aspect, the invention features a method to automate and reduce the amount of effort required to administer policy objects created in a directory service. The method of the present invention is software including a number of user interfaces capable of performing the following tasks: backup and restoration of individual policy objects, granular delegation of security assignments over the policy objects, conversion of policy data to human-readable form for the purpose of analysis and searching, replication of objects across domain and forest boundaries, and determining policy assignments, including predicting the effect a policy will have without implementing the policy.

One or more of the following features may also be included. The policy managers may be software applications. The data sources may be server-type computers associated with a local-area or wide-area network. The creation and storage of a policy can be facilitated on a separate computer using a plurality of software applications designed to create policies.

Embodiments of the invention may have one or more of the following advantages. The method enables the backup and restore of individual policy objects and the attributes relevant to the object being backed up or restored.

The method enables a system whereby a senior administrator can assign security to junior administrators for only a portion of the directory service. The method provides a technique to granularly assign security to only portions of the directory service.

The method analyzes the raw policy data by converting the raw policy data to human-readable form. The method stores the human-readable representation of the data in a separate searchable database, enabling the administrator to search the policy data to find a particular policy attribute.

The method may be utilized to accomplish the replication of objects across domain and forest boundaries without having to manually recreate them.

The method can determine the resultant policy for a particular user on a particular computer which saves time and money by providing accurately planning and troubleshooting of policy objects.

The technique is capable of backing up and restoring the policy objects individually. In the event a group policy object is lost, the administrator need only restore the individual policy object that was deleted or corrupted. This process of restoring only the lost policy object can be completed in a fraction of the time it takes to restore the entire directory service.

The technique is capable of restoring the objects of a backed up policy to either the current domain from which it was backed up or to the parent domain and one or more child domain(s).

To backup a policy the administrator first generates a dedicated folder on a computer. The method provides a user interface displaying a series of fields that are either preset with data or require the administrator to input data of the particular backup.

Other features, objects, and advantages of the invention will be apparent from the description and drawings, and from the claims.

DETAILED DESCRIPTION

Figure 1:
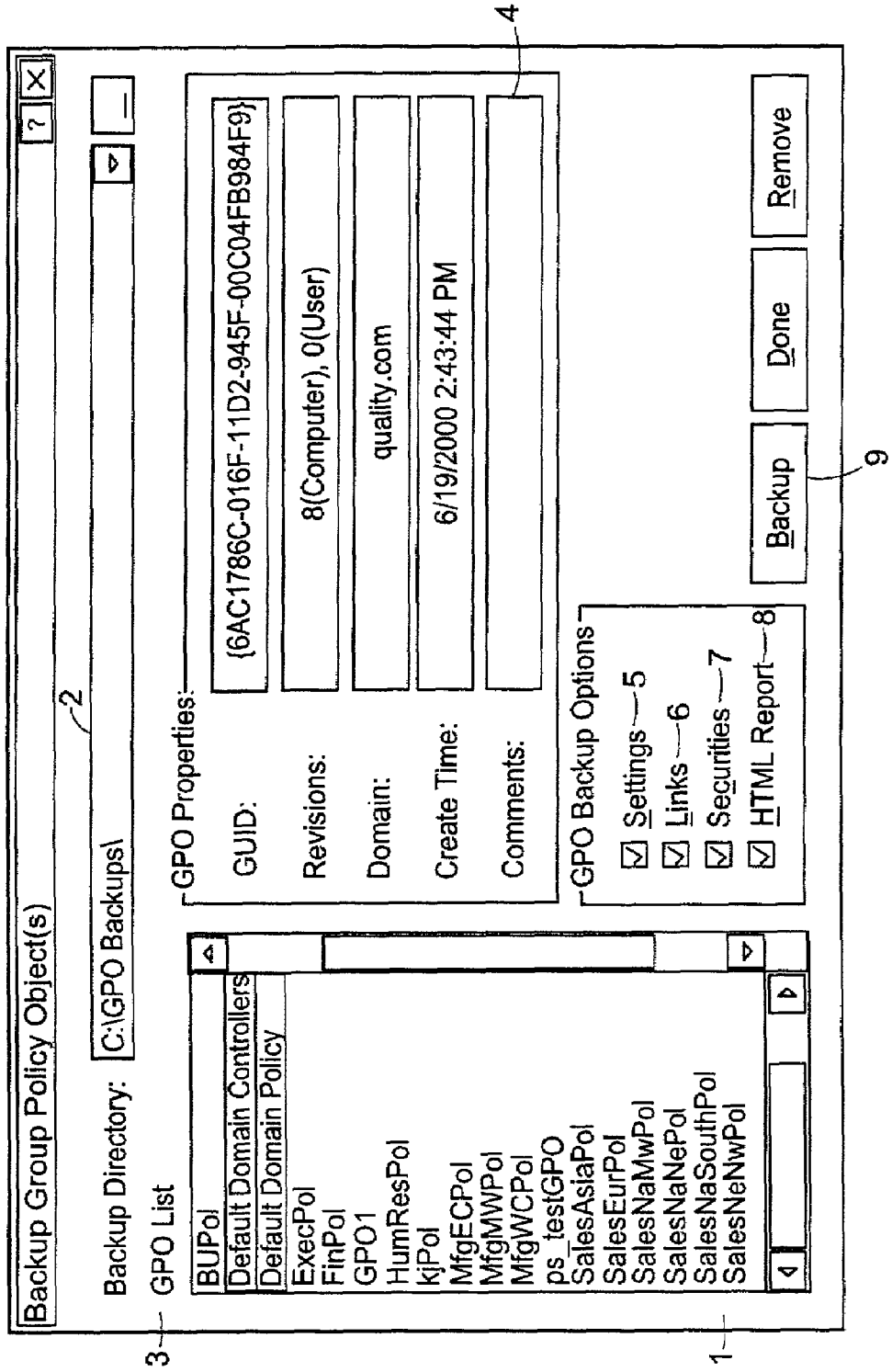
FIG. 1 is an example of a user interface for the input of data to facilitate the backup of a policy object.

Referring to FIG. 1, the administrative user may use a user interface 1. The user interface 1 includes several fields. A Backup Directory field 2 is used to specify a folder into which the administrative user is going to backup policy object information. A Group Policy Object (GPO) List field 3 lists policies available on a current domain. The administrator selects from policies listed for each policy object to be backed up. A Comments field 4 is used to record or remind the administrator of information about a policy. A Settings field 5, activated with a check mark, will backup the policy's links to various organizational units. A Securities field 6, activated with a check mark, will backup the policy's security settings. An HTML Report field 7, activated with a check mark, delivers a list of the policy objects' settings that are backed up.

Upon entering the relevant data in the fields on the user interface 1, the administrator selects a backup button 9. The object is then stored in a backup folder.

Figure 2:
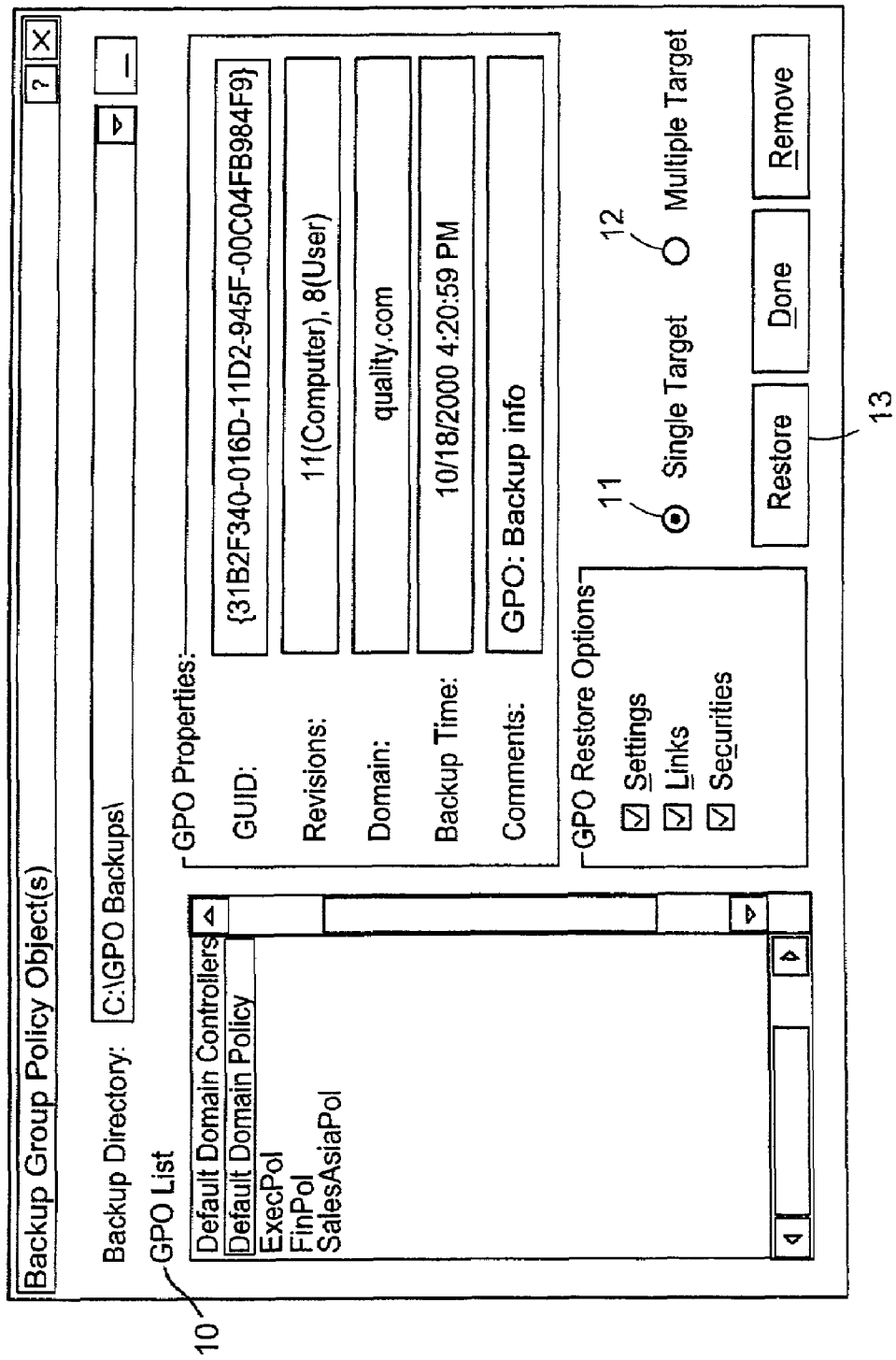
FIG. 2 is an example of a user interface for the input of data to facilitate the restore of a policy object.

Referring to FIG. 2, the administrator uses a second user interface to restore a policy object that has been backed up. The administrator selects the policy object(s) he wishes to restore from the GPO List field 10. The administrator chooses a single target restore field 11 or a multiple target restore field 12. To initiate a restore, the administrator selects a restore button field 13.

Figure 3:
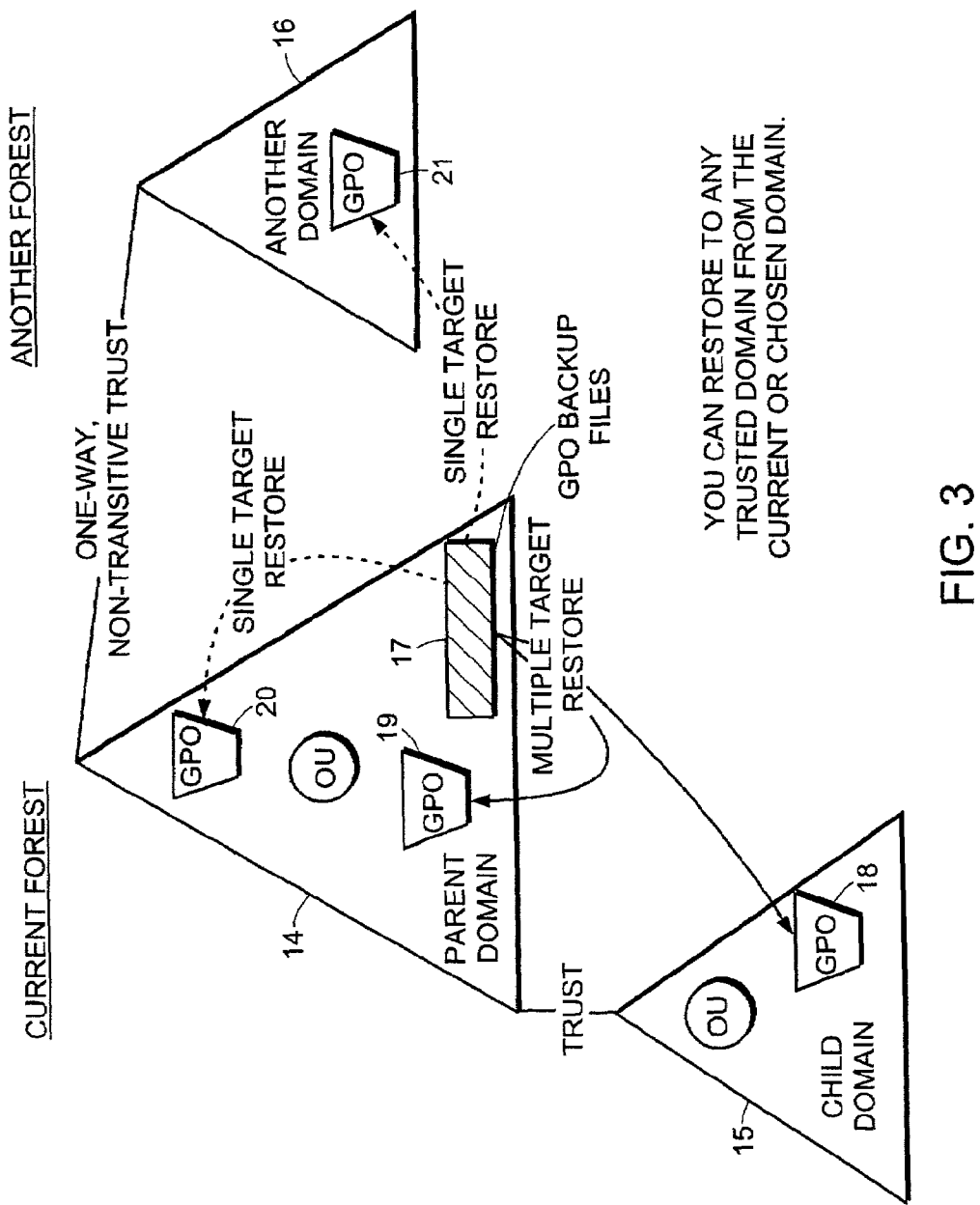
FIG. 3 is a diagram depicting the restoration of policy objects in three domains.

FIG. 3 shows single target restore 11 and multiple target restore 12 with a parent domain 14, a child domain 15 linked to the parent domain 14, and a third domain 16 in a separate forest linked to the parent domain 14 with one-way, non-transitive trust. The policy objects have been backed up in files 17 on the parent domain 14. In a single target restore mode, the backed up policy objects can be restored as a policy object 20 in the parent domain 14 or restored as a policy object 21 in the third domain 16. In a multiple target restore mode, the backed up policy objects can be restored as policy objects 19 and 18 in both the parent domain 14 and child domain 15 respectively.

In one example a system includes the following:

a) Information about network-based entities is stored in a directory in the form of objects. These objects can be assigned attributes, which describe specific characteristics about the object. When a backup or restore of a directory service object spectrum is performed, all the attributes of the object are backed up or restored;

b) In order to protect the information in the directory, directory services offer capabilities for administrators to set security attributes on the object and its attributes. By controlling these attributes, the access to information in active directory service can be controlled. Wiring a backup/restore operation the directory object's security information may be included;

c) Any object in the directory can be linked to other directory objects. Backup and restore information about a linked object may be included;

d) Some of the directory objects store only partial information in the directory. The rest of the information exists outside the directory and only a pointer to that location is maintained within the directory. The directory object backup backs up both the information stored within and outside the directory. Similarly an object restore operation restores the information to both within and outside the directory.

e) Backup of directory object's data onto a network location or to a permanent storage media such as Hard disk, floppy disk, Magnetic Tape or CDROM is provided. Similarly a restore operation of a directory object can be performed from data backed up from any of the above-mentioned mediums;

f) The directory object's data is backed up in a proprietary format. Information about the directory object's attributes, security and linked object information is stored in a proprietary format;

g) Archive documentation about the object along with the object's data may also be included.

In another example, backups may be scheduled periodically through the use of computer readable scripts or instructions.

Directory services have security features prohibiting manipulation of the data or settings. Finer, granular levels of security privileges, down to the level of delegating only the privilege to configure administrative templates may be delegated. Organizations can delegate security privileges without jeopardizing the integrity of the entire directory service. Accordingly, with more administrators the burden placed on a few is now spread over many and organizations can address problems that arise in a quicker fashion.

Computer operating systems may have a unified database that stores configuration data in a hierarchical form. For example, in Microsoft Windows® operating systems this unified database is known as the Registry. The Registry is used to store, inter alia, information about hardware, operating systems, and applications on computers. Under versions of Microsoft Windows®, starting the system, connecting to a network, or running applications involves multiple configuration files with some form of synchronization between them. By changing the data contained in Registry settings, an administrator can control how the personal computer performs many operations.

A policy is a common way to effectuate changes in Registry setting data. The settings that are manipulated through policies are known as policy storage. Policy storage is in binary form and therefore unreadable by a human. Accordingly, once a policy setting is stored in the Registry, it is impossible to read the setting without relying on other tools. One process may include a component that translates the raw policy storage data to human readable form. This process is known as a data abstraction process. Data abstraction saves time in using other software not associated with a directory service.

Policy objects are a special type of directory objects that could contain information on controlling how programs, network resources, and the operating system operate for users and computers in an organization utilizing a distributed computing environment. A policy object's data is stored partially in the directory and partially on external network locations. The process interprets the raw policy data and abstracts the information into a human readable format.

In one example, stored policy object information, such as object name, ID, date of creation, modification and version number can be displayed. In another example, information about the contents of policies are displayed, and the policy data is stored partially inside the directory and partially on a shared network location. The data abstraction process reads the raw policy data and uses an internal knowledgebase to interpret the raw data into meaningful policy information.

One additional feature of the data abstraction process is the ability to report the security information relating to policy objects. The security information contains information as to which accounts have what permissions over the policy object. The the data abstraction process is also capable of reporting on the other directory objects linked to a particular policy object.

The data abstraction process may store the policy documentation in hypertext markup language (HTML) format.

In example, the data abstraction process stores policy information in an offline database. This allows for the creation of a policy repository. The policy repository can be used as the basis for a policy change configuration management solution.

The data abstraction process provides a user interface in which the administrator inputs data to specify the search criteria. The search could be based on: policy object name; the policy object's unique identification code; or a registry key, name or value. Multiple search criteria can be input and performed together by connecting them using Boolean logic operators such as AND, OR. The data abstraction process searches the policy store in Active Directory and on the network location to retrieve all policy objects that match the search criteria.

In one operating system, i.e., Microsoft's Windows 2000, the directory service is called Active Directory. Group policy objects are a special type of Active Directory objects that permit operating systems and other policy-enabled applications to be configured using policies. Objects in Active Directory are organized under a unit called Domain. Multiple such domains constitute an Active Directory Forest. A group policy object can be created and exists within an Active Directory Domain. A policy object cannot be replicated to other domains within the same Forest or a different Forest using existing technology. The data abstraction process provides a method to replicate policy objects across domains in the same or different Forest.

The data abstraction process provides a user interface to input data needed to initiate the replication. For example, the administrator may input the name of the policy objects and the target domains where the policy object will be replicated. In addition, the administrator may customize the replication by indicating one or more of the following: replication of policy object settings; replication of Active Directory objects to which policy object is linked; or the policy object's security filters.

Based on the type of replication indicated, the data abstraction process recreates the policy objects, links, and security options in the target domain. While linking objects, the data abstraction process examines whether that object is present in the target domain. If that object exists it is linked, otherwise it proceeds without linking.

To create security filters on the policy object, the object creates the filter specific to the target domain if it exists in the target domain, or otherwise creates the filter specific to the target domain, otherwise it proceeds with creating the filter.

Additionally, replication information can be saved offline for being executed at a later point in time. Also, policy replication can be scheduled by specifying the time and periodicity of replication.

The data abstraction process provides a method for administrators to predict the resultant configuration when a user logs on from a particular machine. In one example, the data abstraction process accepts the user/machine combination for which the resultant policy needs to be determined. A list of group polices applicable to the user by virtue of the user object's location is determined. The policies are processed based on a particular sequence known as LSDOU (local policies, site, domain, and organizational unit). Local policies are processed first, and the site policies, followed by domain policies and finally the policies associated with various parent and child organizational units under which the user object is located.

The LSDOU processing sequence is the normal policy processing sequence. This normal processing sequence may be altered, however, if there are exceptions such as the presence of special attributes as block policy inheritance, no override, etc. The data abstraction process incorporates business rules that determine whether an exception needs to be made to change the order of policy processing. Policy processing is also determined by evaluating whether the user has been targeted to receive a particular policy. The process achieves this by evaluating the security filters set on every policy object.

The resultant policy is a cumulative setting of all the user and machine policies calculated. The process creates a temporary policy object that would contain the resultant policy settings.

Figure 4:
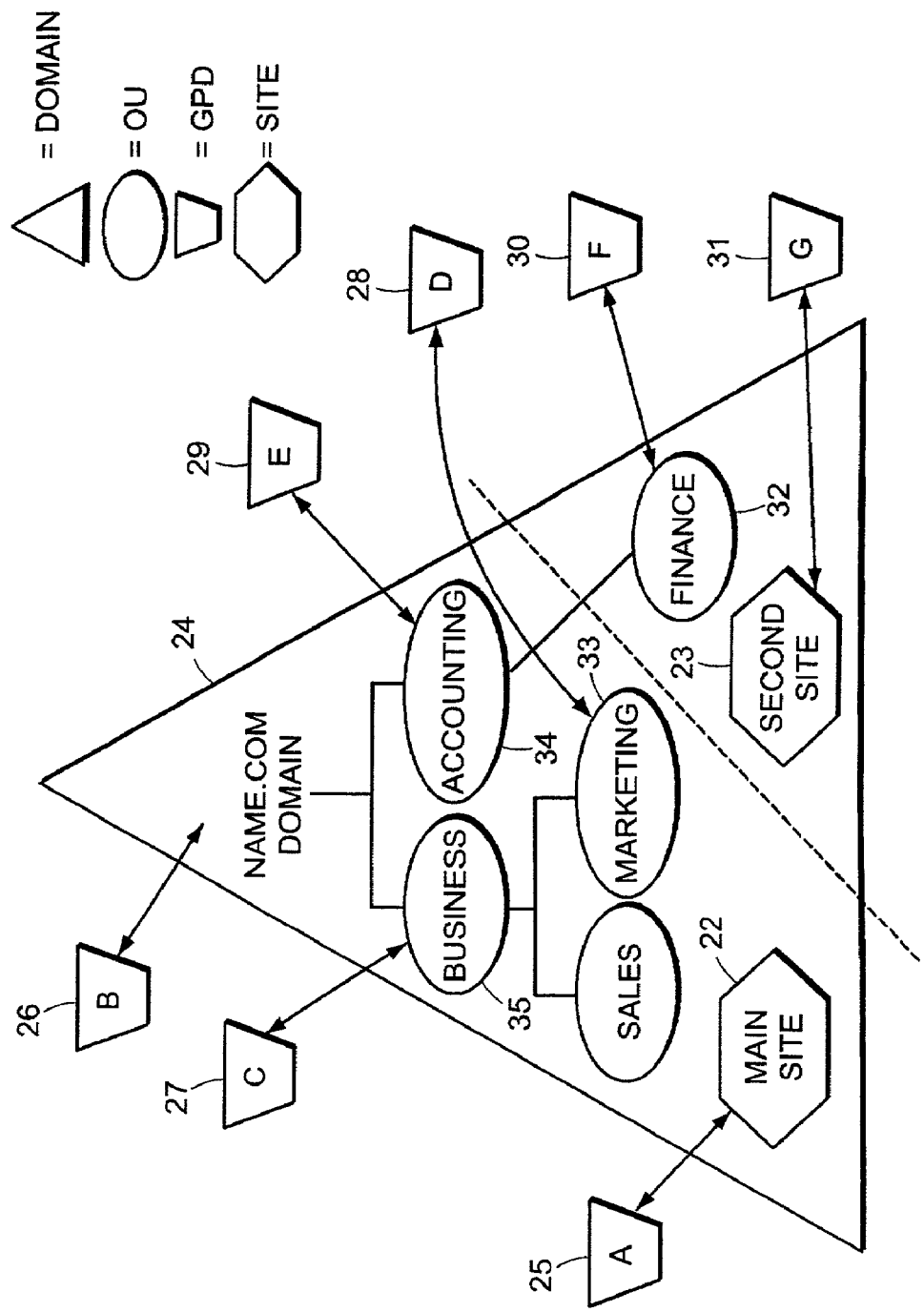
FIG. 4 is a diagram of a single domain containing two different sites.

FIG. 4 shows a first site 22 and a second site 23 belonging to a single domain 24 with policies A 25, B 26, C 27, D 28, E 29, F 30, and G 31. Policies A 25 and G 31 are site-level policies. Policy A 25 is the site-level policy for the first site 22. Policy G 31 is the site-level policy for the second site 23. Policy B 26 is a domain level policy for domain 24. Policies C 27, D 28, E 29, and F 30 are organizational unit policies. Policy C 27 is the organizational unit policy for a business unit 35. Policy D 28 is the organizational unit policy for a marketing unit 33 which reports to the business unit 35. Policy E 29 is the organizational unit policy for an accounting unit 34. Policy F 30 is the organizational policy for a finance unit 32.

The results of the two resultant policies for the Marketing group 33, where the organizational unit in which both the user and computer reside is the marketing unit, and the Finance group 32, where the organizational unit in which both the user and computer reside is the finance unit, are [none]+A+B+(C+D) and [none]+G+B+(E+F), respectively. The resultant policies are achieved by adding in order of the LSDOU hierarchy. Since there are no local policies, that value is "none." Each level of the hierarchy is added, including multiple organizational unit policy objects. If any of the policy objects has either a block policy inheritance or no override setting, additional policy rules are processed to arrive at the resultant policy.

The resultant policy can be used, but is not limited, to the following examples:

First, when administrators want to find the effective computer and user settings resulting from domain and organizational policies, they can select a user and a computer from either the same or different domain.

Second, when administrators need to go beyond a simple resultant policy to include the impact of site policies on the resultant user and computer settings. They select a site after selecting the user and computer accounts. Administrators can choose from a list of sites that are associated with that machine's domain.

While domains and organizational units are logical portions of an infrastructure, sites are physical portions of a network. A site is typically one or more well-connected TCP/IP subnets. The Microsoft Windows 2000 operating system's Active Directory Sites and Services, for example, allows administrators to set site-level policies. The process provides support for site policies in its resultant policy analysis, providing a comprehensive understanding of the net effect of all the enterprise policies on a user/computer combination. On selecting a particular site, that site's group policies are processed in addition to the domain and organizational unit policies.

Figure 5:
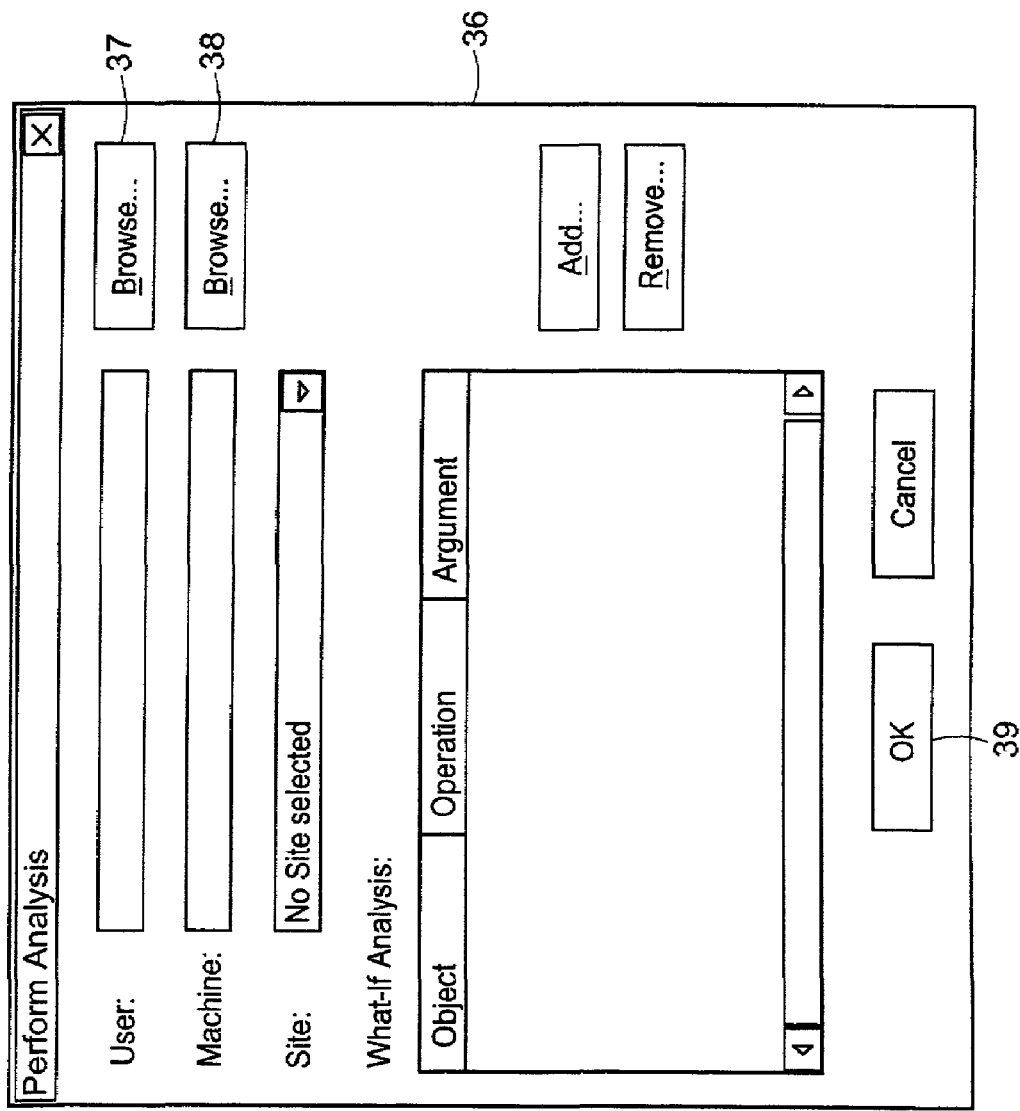
FIG. 5 is an example of a user interface for the input of data to facilitate the analysis of a resultant policy.
Figure 6:
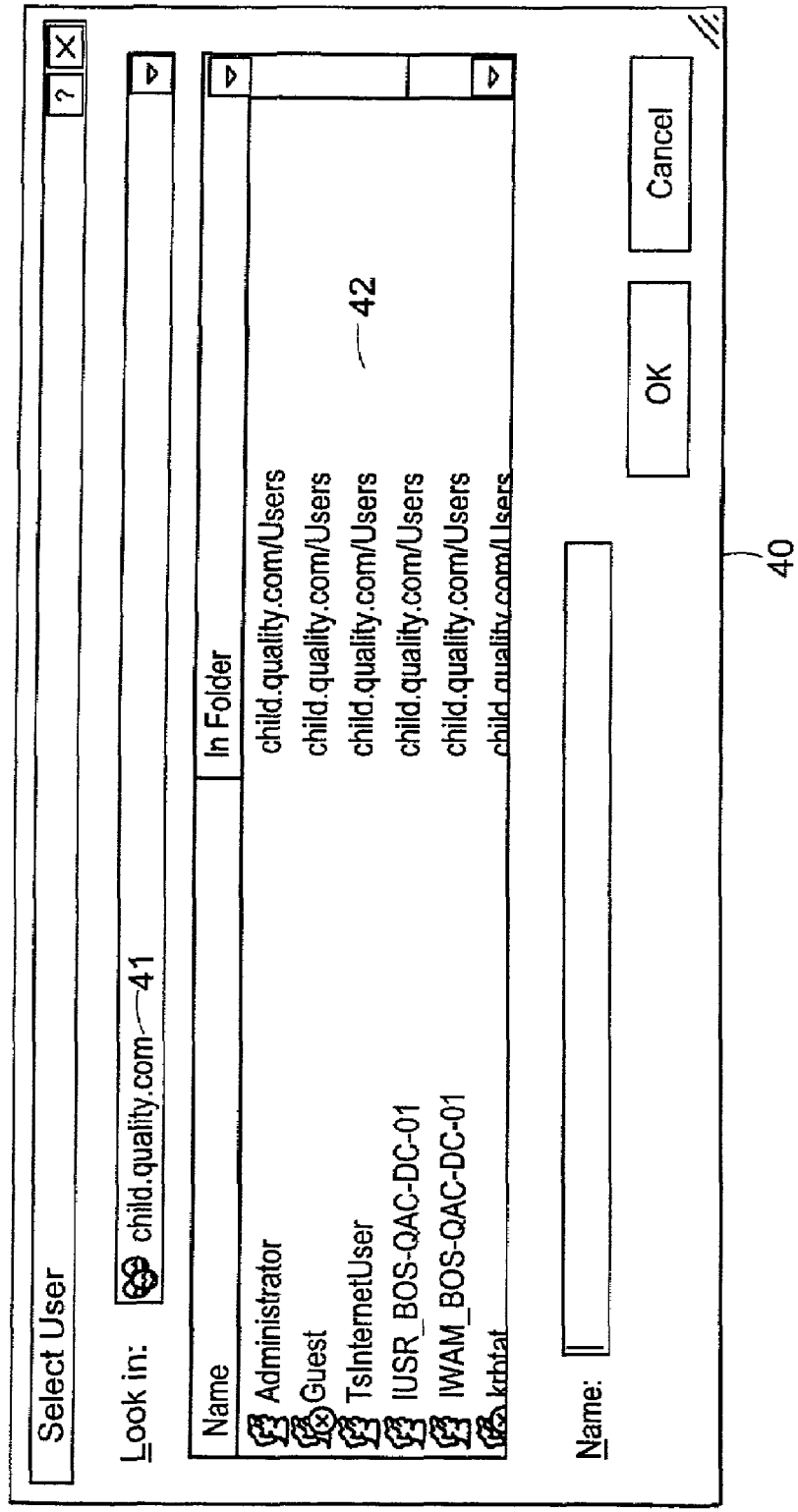
FIG. 6 is an example of a user interface for the input of data to facilitate the analysis of a resultant policy.

The following is one example of how an administrator can obtain a resultant policy. Referring to FIG. 5, the administrator may use a user interface 36 to input the relevant data. To input the name of the user, the administrator would select a first browse button 37. Referring to FIG. 6, upon selecting the first browse button 37, the administrator would be provided another user interface that displays the user's names. In user interface 40, the administrator would input, in a field 41, the domain in which the user will be found. In a second field 42, the administrator would then select the user.

Figure 7:
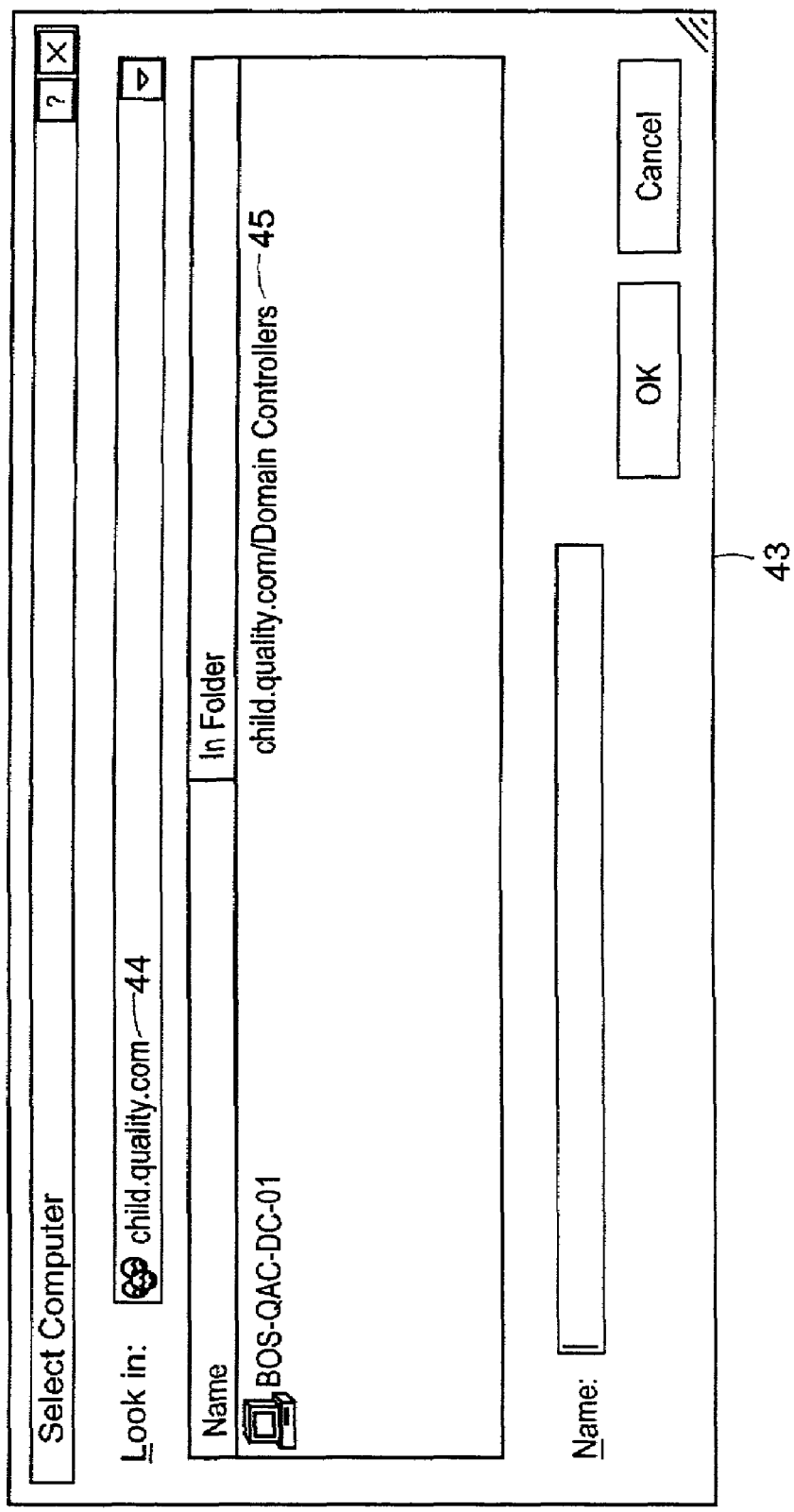
FIG. 7 is an example of a user interface for the input of data to facilitate the analysis of a resultant policy.

To input the name of the machine in user interface 36, the administrator would select a second browse button 38. Upon selecting the second browse button 38, the administrator would be provided a user interface 43 of FIG. 7 that displays the machine names for each domain. In the user interface 43 of FIG. 7, the administrator inputs in field 44 a domain in which the machine will be found. In field 45, the administrator would then select the machine.

When the administrator selects the OK button 39 in the user interface 36, the process creates a resultant node. The node is named after the user and machine that was selected. This analysis name node contains the hierarchy that includes the resultant policies. The analysis name can then be graphically represented according to administrator preference.

One particular example of the process provides a method to enable the administrator to predict the resultant policies by simulating changes in the Active Directory environment. A user or machine moving to a different Active Directory container or added to, or removed from, a security group could cause the changes. The process calculates the resultant policy by providing a computerized method to simulate the changes.

This example enables the administrator to determine the effect of policies before they are implemented. When an administrator modifies or creates a policy, the policy is typically implemented immediately. If the administrator makes a mistake in the policy settings or was unaware of the repercussions of the new settings, the result could be unwanted and far-reaching. Moreover, due to policy inheritance, one group policy change has the potential to block thousands of people from accessing critical applications.

When administrators need to determine what would happen if criteria changed, the process simulates scenarios and combinations created and input by the administrator. For example, the administrator may wish to know the effect if a user or machine is moved to a different organizational unit; or the user or machine is added to or removed from a security group. In each case, the process on provides a method for calculating and reporting the resultant effect of policies on the computer and user combination without actually changing the policy. This helps the administrator to determine the impact of these operations on resultant policies before actually implementing the change.

The process permits the administrator to view and execute a scenario rather than actually implement a new or modified policy without knowing exactly what the policy will affect. The present invention provides a user interface for the administrator to input the information about the object, the particular operation, and the appropriate argument. In one people, the process would provide for three operations: Is a member of group; is not a member of group; and moves to organizational unit. For example, the administrator can create the following argument: User Joe is a member of the Finance Group. The present invention would then provide the administrator a report of what the policy would be if Joe were moved to the Finance Group.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method for selective restoring of policy objects associated with a directory service of a computer system, comprising:

backing up a plurality of the policy objects associated with the directory service of the computer system;

detecting a problem with a selected one of the plurality of policy objects; and restoring the selected one of the plurality of policy objects without restoring others of the plurality of policy objects, further comprising at least one of the following:

wherein backing up includes storing object settings, links to directory service objects, and security information regarding directory service objects;

wherein restoring includes restoring the selected one of the plurality of objects to a domain of the computer system from which it was backed up;

wherein restoring includes restoring the selected one of the plurality of objects to a parent domain of a domain of the computer system from which it was backed up;

wherein restoring includes restoring the selected one of the plurality of objects to a child domain of a domain of the computer system from which it was backed up; or wherein a security privilege of the computer system is required to effect a particular setting of the policy objects and wherein the method further comprises delegating the security privilege to selected users for selected objects in the directory service, wherein various levels of security privileges can be delegated and wherein the levels of security privileges that can be delegated include the ability to configure an entire policy object or the ability to configure only one or a plurality of administrative templates contained in a policy object.

2. The method of claim 1 wherein the directory service further includes user objects.

3. The method of claim 1 wherein the directory service further includes computer objects.

4. The method of claim 1 wherein the directory service further includes printer objects.

5. The method of claim 1 wherein the directory service further includes a directory service component with a descriptive parameter.

6. The method of claim 1 wherein backing up includes storing object settings, links to directory service objects, and security information regarding directory service objects.

7. The method of claim 1 wherein policy data associated with a policy object is stored in a database.

8. The method of claim 7 wherein the database where policy data is stored is the registry.

9. The method of claim 1 wherein the detected problem comprises corruption of the selected one of the plurality of policy objects.

10. The method of claim 1 wherein detecting a problem with a selected one of the plurality of policy objects comprises detecting problems with a plurality of policy objects and restoring the selected one comprises restoring the plurality of policy objects with detected problems.

11. The method of claim 1 wherein restoring the selected one of the plurality of policy objects includes replicating the selected one of the plurality of policy objects across domain boundaries of the computer system.

12. The method of claim 1 further comprising:
analyzing the effect a particular setting of one of the policy objects will have on a particular target represented as a directory service object before the particular setting is implemented in the directory service.

13. The method of claim 1 wherein the security privilege of the computer system is required to effect the particular setting of the policy objects and wherein the method further comprises:
delegating the security privilege to selected users for selected objects in the directory service, wherein the various levels of security privileges can be delegated and wherein the levels of security privileges that can be delegated include the ability to configure an entire policy object or the ability to configure only one or a plurality of administrative templates contained in a policy object.

14. The method of claim 1 wherein restoring includes restoring the selected one of the plurality of objects to the domain of the computer system from which it was backed up.

15. The method of claim 1 wherein restoring includes restoring the selected one of the plurality of objects to the parent domain of the domain of the computer system from which it was backed up.

16. The method of claim 1 wherein the detected problem comprises deletion of the selected one of the plurality of policy objects.

17. The method of claim 1 wherein the security privilege of the computer system is required to restore the particular setting of the policy objects and wherein the method further comprises:
delegating the security privilege to selected users for selected objects in the directory service.

18. The method of claim 1 wherein restoring includes restoring the selected one of the plurality of objects to the child domain of the domain of the computer system from which it was backed up.

19. A computer system configured for selective restoring of policy objects associated with a directory service of a computer system, comprising: means for backing up a plurality of the policy objects associated with the directory service of the computer system;
means for detecting a problem with a selected one of the plurality of policy objects; and
means for restoring the selected one of the plurality of policy objects without restoring others of the plurality of policy objects, further comprising at least one of the following:
wherein the means for backing up includes means for storing object settings, links to directory service objects, and security information regarding directory service objects;
wherein the means for restoring includes means for restoring the selected one of the plurality of objects to a domain of the computer system from which it was backed up;
wherein the means for restoring includes means for restoring the selected one of the plurality of objects to a parent domain of a domain of the computer system from which it was backed up;
wherein the means for restoring includes means for restoring the selected one of the plurality of objects to a child domain of a domain of the computer system from which it was backed up; or
wherein a security privilege of the computer system is required to effect a particular setting of the policy objects and wherein the system further comprises means for delegating the security privilege to selected users for selected objects in the directory service, wherein various levels of security privileges can be delegated and wherein the levels of security privileges that can be delegated include the ability to configure an entire policy object or the ability to configure only one or a plurality of administrative templates contained in a policy object.

* * * * *